United States Patent

Tebo

Patent Number: 6,071,054
Date of Patent: Jun. 6, 2000

[54] DECK FASTENERS

[76] Inventor: Glenn J. Tebo, 10 Grand View Ter., Kingston, N.H. 03848

[21] Appl. No.: 09/271,962

[22] Filed: Mar. 18, 1999

Related U.S. Application Data

[60] Continuation-in-part of application No. 09/059,847, Apr. 14, 1998, Pat. No. 5,927,923, which is a division of application No. 08/667,473, Jun. 21, 1996, Pat. No. 5,685,324.

[51] Int. Cl.[7] ..................................................... F16B 15/00
[52] U.S. Cl. ........................... 411/459; 411/461; 411/921
[58] Field of Search ................................... 411/458, 459, 411/460, 461, 462, 921, 457

[56] References Cited

U.S. PATENT DOCUMENTS

| | | | |
|---|---|---|---|
| 642,377 | 1/1900 | Smith | 411/459 |
| 989,198 | 4/1911 | Slayton | 411/458 |
| 1,186,383 | 6/1916 | Danly | 411/458 |
| 1,390,918 | 9/1921 | McFarland | 411/458 |
| 1,510,360 | 9/1924 | Van Rijmenam | 411/457 |
| 2,270,284 | 1/1942 | Faggard | 411/473 |
| 2,620,705 | 12/1952 | Podvinecz et al. | 411/460 |
| 3,071,827 | 1/1963 | Van Buran, Jr. | 411/458 |
| 3,331,180 | 7/1967 | Vissing et al. | 411/457 |
| 3,373,646 | 3/1968 | Ehlert | 411/473 |
| 3,741,068 | 6/1973 | Andemskiewicz | 52/712 |
| 3,813,982 | 6/1974 | Perkins . | |
| 3,821,919 | 7/1974 | Knohl . | |
| 3,875,648 | 4/1975 | Bone | 29/417 |
| 3,885,491 | 5/1975 | Curtis . | |
| 3,945,293 | 3/1976 | Krol . | |
| 3,969,975 | 7/1976 | Krol . | |
| 4,131,975 | 1/1979 | Niedecker | 24/30.5 |
| 4,923,350 | 5/1990 | Hinksman et al. | 411/452 |
| 4,925,141 | 5/1990 | Classen | 248/217.2 |
| 4,949,929 | 8/1990 | Kesselman et al. | 240/300 |
| 5,027,573 | 7/1991 | Commins et al. | 52/489 |
| 5,222,975 | 6/1993 | Crainich | 52/489 |
| 5,333,979 | 8/1994 | Raffoni | 411/477 |

FOREIGN PATENT DOCUMENTS 443789  1/1949  Italy .

*Primary Examiner*—Neill Wilson
*Attorney, Agent, or Firm*—Fish & Richardson P.C.

[57] ABSTRACT

A fastener for securing boards to joists includes a first member having two parallel sharp, pointed prongs, and a third sharp, pointed prong extending from the first member. One of the prongs of the first member is driven into a first board and the other of the prongs is driven into the joist. The third prong secures an adjacent board to the first board.

7 Claims, 5 Drawing Sheets

DECK FASTENERS

This application is a continuation-in-part of U.S. Ser. No. 09/059,847, filed Apr. 14, 1998, now U.S. Pat. No. 5,927,923 which is a divisional of U.S. Ser. No. 08/667,473, filed Jun. 21, 1996, now U.S. Pat. No. 5,685,324.

BACKGROUND OF THE INVENTION

This invention relates to deck fasteners.

Brackets, clips, and anchors for securing boards to joists without nail heads protruding from the deck surface are known. These securing devices require an additional fastener to secure them to the boards and/or joists.

SUMMARY OF THE INVENTION

The invention, features, in general, a fastener for securing boards to joists thereunder that includes a first member having two parallel sharp, pointed prongs, and a third sharp, pointed prong extending from the first member. One of the prongs of the first member is driven into a first board and the other of the prongs is driven into the joist. The third prong secures an adjacent board on top of the joist to the first board.

In preferred embodiments, the third prong is generally parallel to the first and second prong and Extends in the opposite direction, providing a fastener that is particularly useful for securing deck boards at an acute angle to the joists, e.g., in a diagonal or herringbone arrangement. The prongs of the first member have lengths in the range of about ½ to 2 inches, and the third prong has a length in the range of about ¼ to 1 inch. The prongs of the first member and the third prong have diameters in the range of about 1/16 to ¼ inch.

According to another aspect of the invention, a method of securing boards to joists thereunder includes driving a first member having two parallel sharp, pointed prongs into a first board and into a joist thereunder such that one of the prongs enters the first board and the other of the prongs enters the joist, and driving an adjacent board positioned on top of the joist against a third sharp, pointed prong extending from the first member.

Advantages of the invention include the lack of nail heads protruding from the deck surface, and, as compared to existing brackets, clips, and anchors, fewer steps to secure boards to joists resulting in a savings in labor, ease of manufacture, and single piece construction.

DESCRIPTION OF THE PREFERRED EMBODIMENTS

Figure 1:
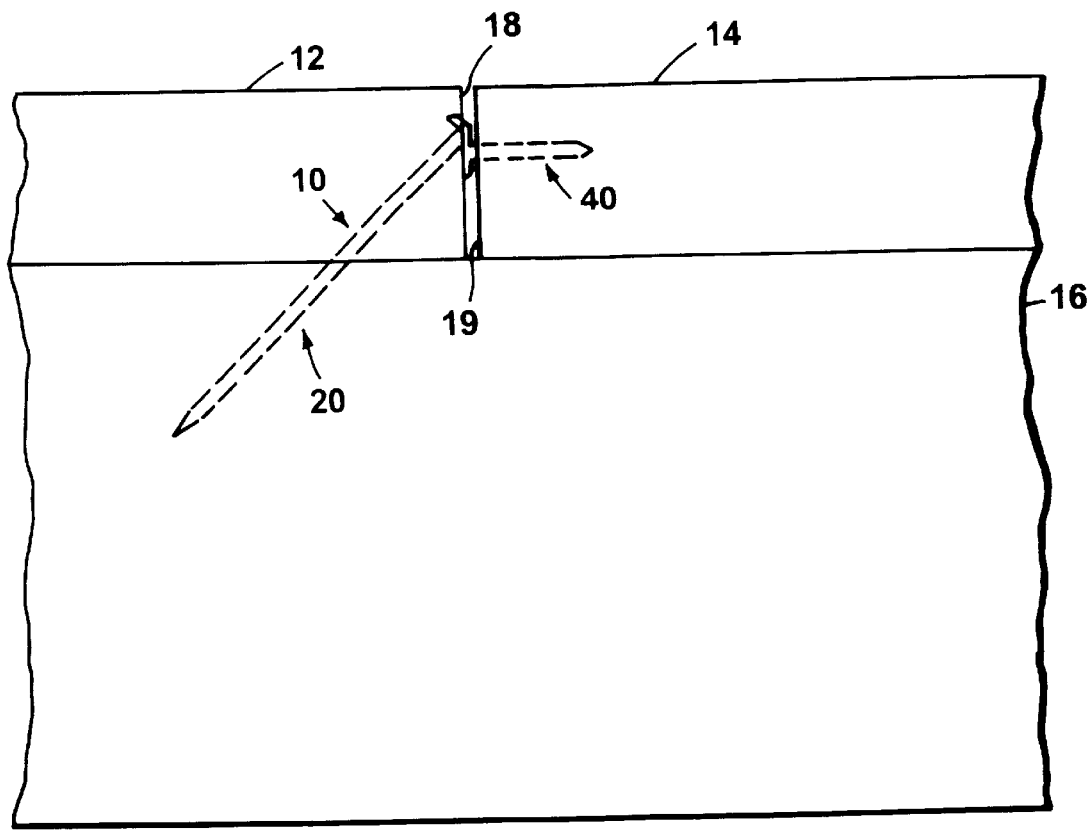
FIG. 1 shows a nail according to the invention securing adjacent floorboards to a joist.
Figure 2:
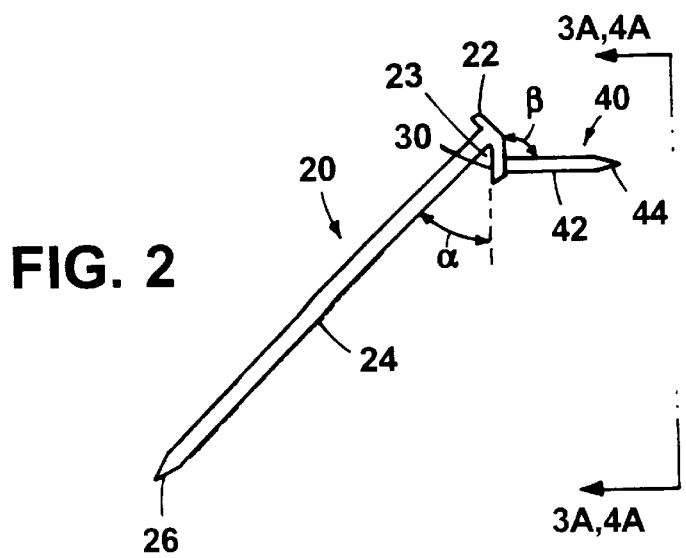
FIG. 2 shows the nail of FIG. 1.

Referring to FIG. 1, a nail 10 for fastening boards 12, 14 to a joist 16 thereunder includes a first prong 20 and a second prong 40. Referring also to FIG. 2, first prong 20 includes a head 22 for driving prong 20 through an edge 18 of board 12 and down into joist 16.

Prong 40 includes a shank 42 oriented at an angle $\alpha$ in the range of about 30 to 60 degrees, preferably about 45 degrees, to a shank 24 of prong 20, and at an angle $\beta$ of about 90 degrees to a head 30 of prong 40. Shanks 24 and 42 have sharp, pointed tips 26, 44, respectively. After joining of board 12 to joist 16 with prong 20, adjacent board 14 is hammered into place driving prong 40 into edge 19 of board 14. Preferably, prong 40 is positioned after joining of board 12 to joist 16 to be approximately centered on edge 19 of board 14.

Figures 3, 3A:
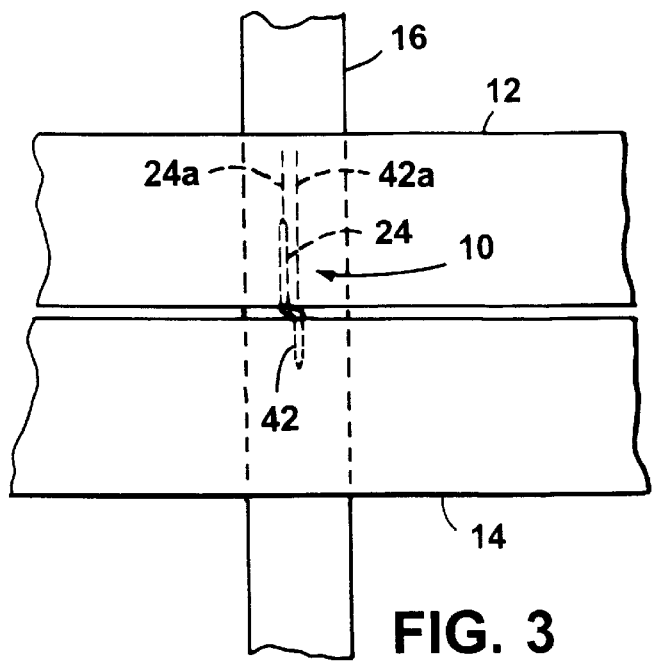
FIG. 3 is a top view of an embodiment of the FIG. 1 nail shown securing adjacent floorboards to a joist.
FIG. 3A is a side view of the FIG. 1 nail, taken along lines 3A—3A of FIG. 2.
Figures 4, 4A:
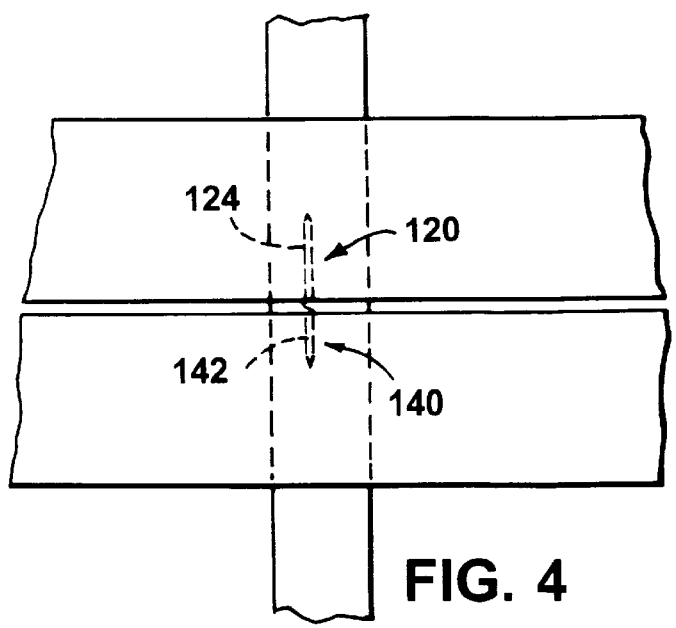
FIG. 4 is a top view of another embodiment of the nail shown securing adjacent floorboards to a joist.
FIG. 4A is a side view of the nail, taken along lines 4A—4A of FIG. 2.

Referring to FIGS. 3 and 3A, in a particular embodiment of nail 10, shank 24 of prong 20 lies along a first plane 24a and shank 42 of prong 40 lies along a second plane 42a parallel to and offset from plane 24a. In an alternative embodiment of nail 10, shown in FIGS. 4 and 4A, a shank 142 of a prong 140 is positioned in-line with respect to a shank 124 of a prong 120.

Shank 42 of prong 40 has a length, e.g., in the range of about ¼ to 1 inch; shank 24 of prong 20 has length, e.g., in the range of about 1 to 3 inches; and shanks 24 and 42 have diameters, e.g., in the range of about 1/16 to ¼ inch.

Figure 5:
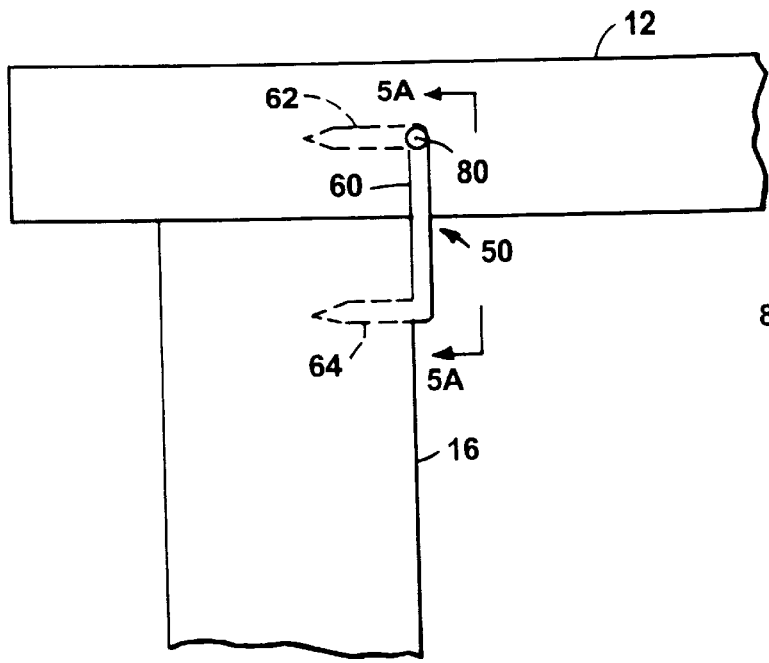
FIG. 5 shows a staple according to the invention securing adjacent floorboards to a joist.
Figure 5A:
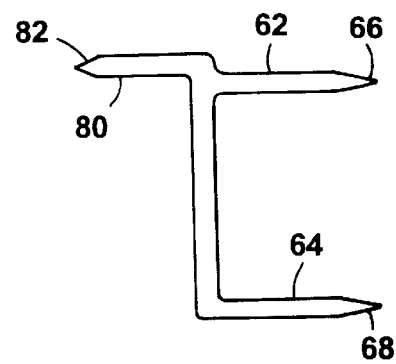
FIG. 5A is a side view of the staple of FIG. 5, taken along lines 5A—5A of FIG. 5.

Referring to FIGS. 5 and 5A, a staple 50 for fastening boards 12, 14 to a joist 16 thereunder includes a U-shaped member 60 having two parallel prongs 62, 64, and a third prong 80. Prong 62 is driven into board 12 while prong 64 is driven into joist 16.

Figure 6:
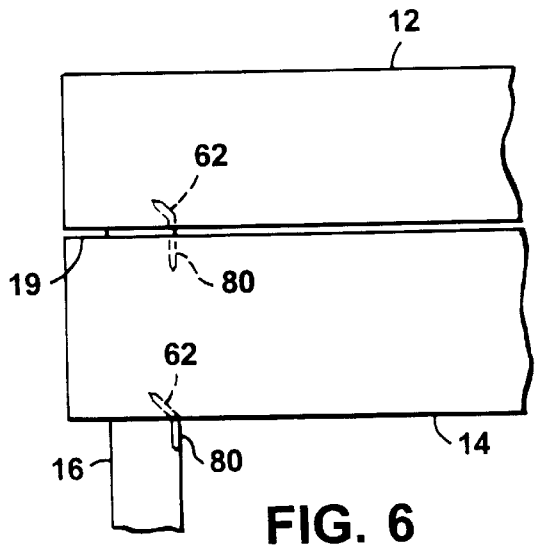
FIG. 6 is a top view of the staple shown securing adjacent floorboards to a joist.
Figure 7:
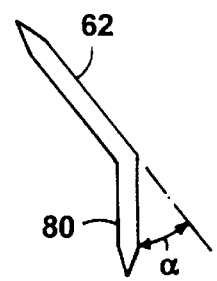
FIG. 7 is a top view of the staple of FIG. 5.

As shown in FIGS. 6 and 7, prong 80 is oriented at an angle γ the range of about 35 to 55 degrees, preferably about 45 degrees, to prong 62. Prongs 62, 64, and 80 have sharp, pointed tips 66, 68, 82, respectively. After joining of board 12 to joist 16 with prongs 62, 64, adjacent board 14 is hammered into place driving prong 80 into edge 19 of board 14. Preferably, prong 80 is positioned after joining of board 12 to joist 16 to be approximately centered on edge 19 of board 14.

Prong 80 has a length, e.g., in the range of about ¼ to 1 inch; prongs 62, 64 have lengths, e.g., in the range of about ½ to 2 inches; and prongs 62, 64, and 80 have diameters, e.g., in the range of about 1/16 to ¼ inch.

Figure 8:
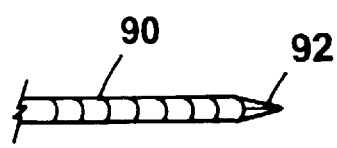
FIG. 8 is a prong tip that can be used in the nails or staples according to the invention.
Figure 8A:
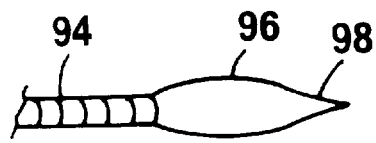
FIG. 8A is an alternative embodiment of a prong tip.

Nail 10 and staple 50 can be made from, e.g., steel or stainless steel wire. The prong dimensions can be varied to accommodate the particular board and joist sizes. FIGS. 8 and 8A show two embodiments of prong tips 26, 44, 66, 68, and 82. In FIG. 8, a round wire 90 is shown with a pointed tip 92, and in FIG. 8A, a round wire 94 is shown with a flattened end 96 forming a chisel point 98. Any variety of prong shapes can be employed, e.g., with barbs or non-round cross-sections. What is important is that the prong can be driven into the deck and joist material.

Figure 9:
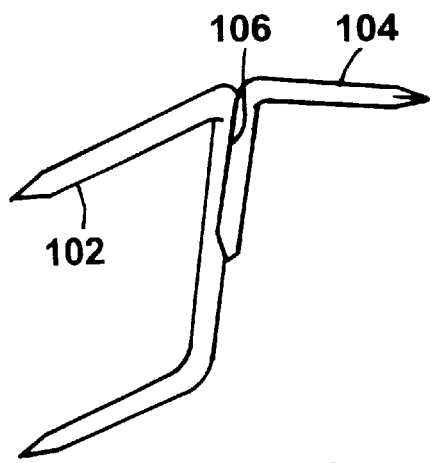
FIG. 9 shows an embodiment of the staple of FIG. 5.
Figure 9A:
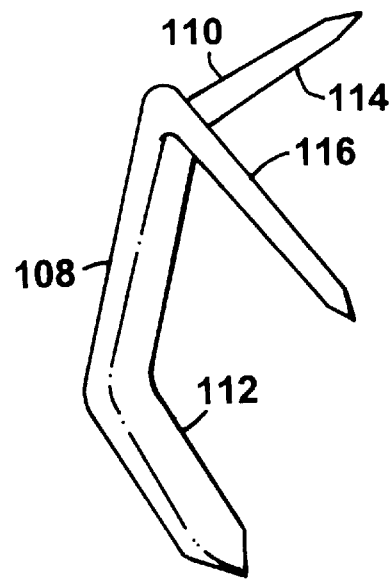
FIG. 9A is an alternative embodiment of the staple of FIG. 5.
Figure 9B:
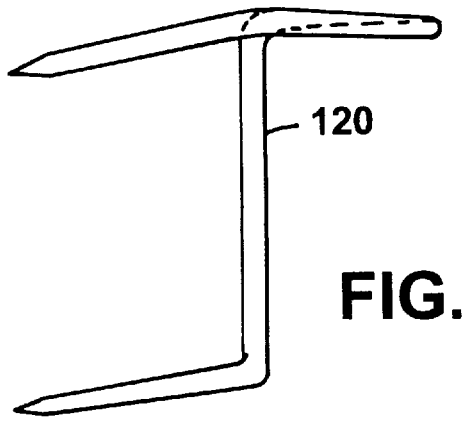
FIG. 9B is another alternative embodiment of the staple of FIG. 5.

Various ways of forming staple 50 are shown in FIGS. 9–9B. In FIG. 9, preshaped first and second stainless steel wires 102, 104 are joined at 106. In FIG. 9A, a uniform width piece of steel 108 is cut along edge 110 and split such that portion 112 is twice the width of prongs 114 and 116. In FIG. 9B, a single length of round wire 120 is bent into shape. Stamp out of sheet steel or extruded.

Figure 10:
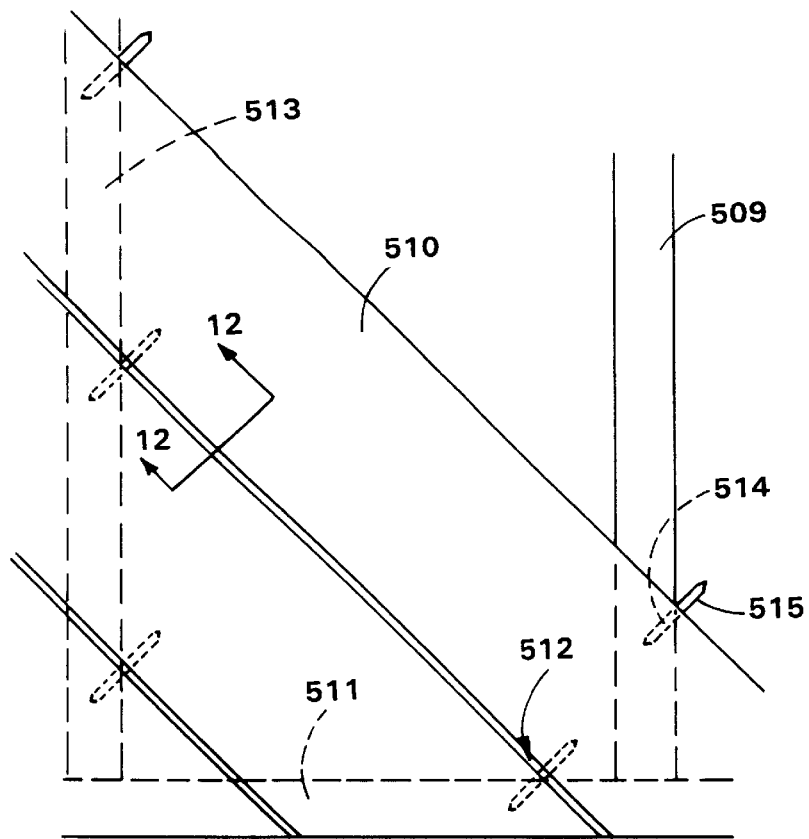
FIG. 10 shows a top view of an alternative embodiment of staples according to the invention securing adjacent floorboards to a joist.
Figure 11:
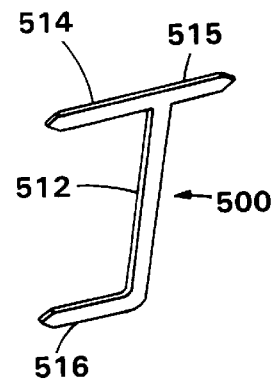
FIG. 11 shows a staple of FIG. 10.
Figure 12:
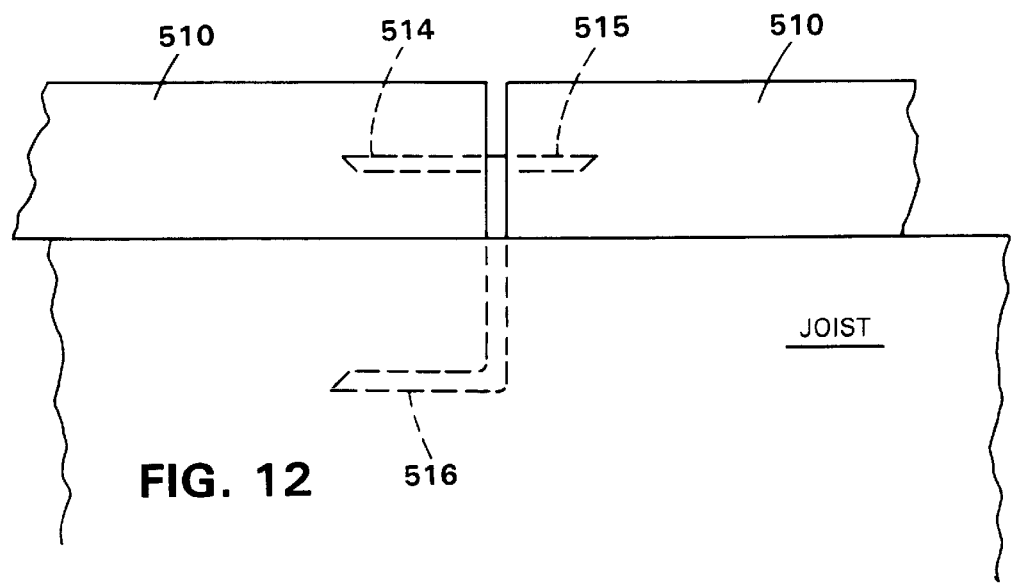
FIG. 12 is a partial sectional view, taken at 12—12 of FIG. 10, showing a staple of FIG. 10 securing adjacent floorboards to a joist.

FIGS. 10–11 show an uncovered section of deck joist 509, and a covered section 513, that is fastened to a rim joist 511. The joists are covered by the decking boards 510, that are installed at 45 degrees to the deck joist. When diagonal decking is to be installed, it is desirable to use straight deck staple 500. This version of the staple will be installed the same as the FIG. 5 deck staple, at the intersection of decking and joist. Also staple 500 will be driven from the same gun still at 45 degrees to the deck joist. The lower prong 516 of staple 500, still enters the deck joist at a 45 degree angle to the joist. With diagonal decking the upper prong 514, enters the deck board at 90 degrees. This version still has the third prong 515, at 90 degrees to oncoming deck boards. The deck boards are spaced by the vertical portion 512 of the staple.

The invention provides fasteners for joining boards to joists without nail heads protruding from the deck surface. The fasteners result in a savings in labor because the joining requires fewer steps as compared to existing brackets, clips, and anchors. The fasteners of the invention are also easier to manufacture and are of a single piece construction as compared to existing brackets, clips, and anchors which require an additional fastener to secure them.

What is claimed is:

1. Fastener for securing boards to joists thereunder, comprising a first member having two parallel sharp, pointed prongs joined together by a connecting portion, one of said prongs for being driven into a first board and the other of said prongs for being driven into a joist thereunder, and a third sharp, pointed prong extending from said connecting portion of said first member for securing an adjacent board on top of said joist to the first board, said connecting portion being longer than said first and second prongs.

2. The fastener of claim 1 wherein said third prong is generally parallel to said first and second prongs of said first member and extends in the opposite direction.

3. The fastener of claim 1 wherein said prongs of said first member have lengths in the range of about ½ to 2 inches, and said third prong has a length in the range of about ¼ to 1 inch.

4. The fastener of claim 1 wherein said prongs of said first member and said third prong have diameters in the range of about 1/16 to ¼ inch.

5. A method of securing boards to joists thereunder, comprising:

driving a first member having two parallel sharp, pointed prongs joined together by a connecting portion into a first board and into a joist thereunder such that one of said prongs enters the first board and the other of said prongs enters the joist, and driving an adjacent board positioned on top of said joist against a third sharp, pointed prong extending from said connecting portion of said first member at an angle relative to said connecting portion to secure the adjacent board to the first board.

6. The method of claim 5 wherein said third prong is generally parallel to said prongs of said first member and extends in the opposite direction.

7. The fastener of claim 6 wherein said first and second boards make an acute angle with said joist.

\* \* \* \* \*

UNITED STATES PATENT AND TRADEMARK OFFICE
CERTIFICATE OF CORRECTION

PATENT NO. : 6,071,054
DATED : June 6, 2000
INVENTOR(S) : Glenn J. Tebo

It is certified that error appears in the above-identified patent and that said Letters Patent is hereby corrected as shown below:

Title page,
Item [60], "08/667,473" should be -- 08/667,389 --
"5,685,324" should be -- 5,738,473 --

Item [56], after 3,071,827 delete [1/1963] insert -- 7/1963 --
"3,813,982" should be -- 3,813,985 --

Column 1,
Line 5, "08/667,473" should be -- 08/667,389 --
Line 6, "5,685,324" should be -- 5,738,473 --
Line 26, delete [Extends] insert -- extends --

Signed and Sealed this

Sixteenth Day of October, 2001

Attest:

NICHOLAS P. GODICI
Attesting Officer
*Acting Director of the United States Patent and Trademark Office*